United States Patent
Bansal et al.

(10) Patent No.: US 9,197,587 B2
(45) Date of Patent: Nov. 24, 2015

(54) USER INITIATED RULE-BASED RESTRICTIONS ON MESSAGING APPLICATIONS

(71) Applicant: International Business Machines Corporation, Armonk, NY (US)

(72) Inventors: Ravi P. Bansal, Tampa, FL (US); Salil P. Gandhi, Pune (IN); Saidas T. Kottawar, Maharashtra (IN); Sandip D. Mahajan, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/542,037

(22) Filed: Nov. 14, 2014

(65) Prior Publication Data

US 2015/0074212 A1    Mar. 12, 2015

Related U.S. Application Data

(63) Continuation of application No. 12/818,589, filed on Jun. 18, 2010.

(51) Int. Cl.
*G06F 15/16* (2006.01)
*H04L 12/58* (2006.01)

(52) U.S. Cl.
CPC .............. *H04L 51/04* (2013.01); *H04L 12/585* (2013.01); *H04L 12/5895* (2013.01); *H04L 51/12* (2013.01); *H04L 51/38* (2013.01)

(58) Field of Classification Search
CPC ............................................ H04M 2215/7833
USPC ....................................................... 709/206
See application file for complete search history.

(56) References Cited

U.S. PATENT DOCUMENTS 7,175,250 B2    2/2007    Nimura
7,606,862 B2    10/2009   Swearingen et al.
(Continued)

FOREIGN PATENT DOCUMENTS

KR    2006014506 A    2/2006
KR    2007109283 A    11/2007

OTHER PUBLICATIONS

Jackson et al., "Breaking Bad Habits: The Negative Effect of Email and Instant Messaging on the Workplace" In M. E. Khosrow-Pour (Ed.), Information Technology & Organizations: Trends, Issues, Challenges & Solutions. Philadelphia: Idea Group, Hershey, USA.
(Continued)

*Primary Examiner* — Hamza Algibhah
(74) *Attorney, Agent, or Firm* — Scully, Scott, Murphy & Presser, P.C.; David L. Adour, Esq.

(57) ABSTRACT

A method, system and computer program product are disclosed for user initiated rule based restrictions on sending messages from a sender to a receiver in a communications network. The receiver establishes a set of rules for the sender that allows the sender a limited number of defined messages events with the receiver. The defined message events may be messages or message sessions. When the sender attempts to send a message to the receiver, it is determined whether a message session currently exists between the sender and the receiver. If a current session exists, the rules set by the receiver are used to determine if the message is allowed to be sent to the receiver. If a session does not currently exist, the rules are used to determine whether a new session is allowed. If a new message session is allowed, a new session is established, and the message is sent to the receiver during the new session.

20 Claims, 5 Drawing Sheets

(56) References Cited

U.S. PATENT DOCUMENTS

| | | | |
|---|---|---|---|
| 7,647,411 B1 | 1/2010 | Schiavone et al. | |
| 7,672,998 B1* | 3/2010 | Haskins et al. | 709/206 |
| 7,908,380 B1* | 3/2011 | Chu et al. | 709/227 |
| 7,916,643 B2 | 3/2011 | DeVal et al. | |
| 7,953,814 B1 | 5/2011 | Chasin et al. | |
| 8,098,803 B1 | 1/2012 | Croak et al. | |
| 8,144,587 B2 | 3/2012 | Heinz et al. | |
| 8,560,655 B2* | 10/2013 | Logan et al. | 709/223 |
| 2002/0159387 A1 | 10/2002 | Allison et al. | |
| 2003/0055908 A1 | 3/2003 | Brown et al. | |
| 2004/0154022 A1 | 8/2004 | Boss et al. | |
| 2004/0205135 A1 | 10/2004 | Hallam-Baker | |
| 2004/0236832 A1 | 11/2004 | Morris et al. | |
| 2005/0020289 A1 | 1/2005 | Kim et al. | |
| 2005/0107065 A1 | 5/2005 | Bernhart | |
| 2005/0132013 A1 | 6/2005 | Karstens | |
| 2006/0064646 A1 | 3/2006 | Kelso et al. | |
| 2006/0101021 A1 | 5/2006 | Davis et al. | |
| 2006/0135168 A1 | 6/2006 | Cai et al. | |
| 2006/0168009 A1 | 7/2006 | Lyle et al. | |
| 2006/0168048 A1 | 7/2006 | Lyle et al. | |
| 2006/0190547 A1 | 8/2006 | Bhogal et al. | |
| 2006/0224673 A1 | 10/2006 | Stern et al. | |
| 2007/0016641 A1 | 1/2007 | Broomhall | |
| 2007/0043866 A1* | 2/2007 | Garbow et al. | 709/226 |
| 2007/0203993 A1 | 8/2007 | Cai et al. | |
| 2007/0288580 A1 | 12/2007 | Kaminsky et al. | |
| 2007/0297408 A1 | 12/2007 | Kim et al. | |
| 2008/0066180 A1 | 3/2008 | Repasi et al. | |
| 2008/0085700 A1 | 4/2008 | Arora | |
| 2008/0102799 A1 | 5/2008 | Dholakia et al. | |
| 2008/0281933 A1* | 11/2008 | Boss et al. | 709/206 |
| 2009/0044013 A1* | 2/2009 | Zhu et al. | 713/170 |
| 2009/0082042 A1 | 3/2009 | Harendra et al. | |
| 2009/0106770 A1 | 4/2009 | Gan et al. | |
| 2009/0144806 A1 | 6/2009 | Gal et al. | |
| 2009/0219940 A1 | 9/2009 | Jansson | |
| 2009/0307326 A1 | 12/2009 | Landsman et al. | |
| 2010/0011124 A1 | 1/2010 | Wei et al. | |
| 2010/0057836 A1 | 3/2010 | Anbuselvan | |
| 2010/0069095 A1 | 3/2010 | Yahav et al. | |
| 2010/0077190 A1 | 3/2010 | Brown et al. | |
| 2010/0081464 A1 | 4/2010 | Qu et al. | |
| 2010/0088302 A1 | 4/2010 | Block | |
| 2010/0138512 A1 | 6/2010 | Morris et al. | |
| 2010/0299393 A1 | 11/2010 | O'Sullivan et al. | |
| 2011/0022664 A1 | 1/2011 | Ainsworth | |
| 2011/0035453 A1 | 2/2011 | Koul et al. | |
| 2011/0040724 A1 | 2/2011 | Dircz | |
| 2011/0087741 A1 | 4/2011 | Stern et al. | |
| 2011/0161437 A1* | 6/2011 | Cox et al. | 709/206 |
| 2012/0117235 A1* | 5/2012 | Castro Castro et al. | 709/224 |

OTHER PUBLICATIONS

English language Abstract of Korean Patent No. KR 2006014506A.
English language Abstract of Korean Patent No. KR 2007109283A.

* cited by examiner

USER INITIATED RULE-BASED RESTRICTIONS ON MESSAGING APPLICATIONS

CROSS REFERENCE TO RELATED APPLICATION

This application is a continuation of copending U.S. patent application Ser. No. 12/818,589, filed Jun. 18, 2010, the disclosure of which is hereby incorporated herein by reference in its entirety.

BACKGROUND OF THE INVENTION

The present invention generally relates to messaging applications, such as text messaging and instant messaging. More specifically, the invention relates to user initiated rule based restrictions on the use of messaging applications.

BACKGROUND ART

A wide range of communication technologies are available and in common use that enable communications by voice, email or the like. Today, communications may be commonly performed using various messaging services such as Instant Messaging (IM), Short Message Service (SMS), Multimedia Messaging Service (MMS), and Enhanced Message Service (EMS).

IM allows a user to send and receive messages nearly instantaneously with other IM service users over a network or collection of networks, such as the Internet. A computer connected to the Internet can access the IM service using a client application. The client application can be implemented as a local client or a browser based client. A local client is a program which is stored on the computer and provides an interface allowing a user to access the IM service. A browser based client based client is a program which is generally provided by a web server. The interface loaded from the server allows the user to access the IM service. IM services are provided to an IM service domain which is comprised of entities having an account with the IM service.

To use IM, a user establishes an account by providing account information including a user identifier, a password, and a list of messenger contacts. Subsequent login to the service requires the user to provide the user identifier and password. Upon confirmation of the login information with the user's account information, the particular client (either local or browser based) displays an interface indicating the user's presence, messenger contact list and the presence of each contact. Presence is a status indication of whether an entity is online or offline, and can also be used to indicate a state of "busy", "away", "out to lunch", or other states. If the entity, such as the user or a contact on the user's messenger contact list, is logged in to a messenger server within the IM service, then the entity's presence is "online". Otherwise, the presence for the entity is "offline".

The user may select a contact from the messenger contact list displayed in an IM interface to initiate a conversation. Once selected, the client application associate with each conversation member provides a conversation window. In some IM systems, the client applications associated with a conversation receive direct contact information for each other to provide direct communication between them. In other IM services, the client applications for each conversation member are connected to each other through the IM system. When a conversation member sends a message, the IM system receives the message, finds the recipient member's computer location and routes the message to the particular computer. Instant messaging (IM) services are typically limited to interactions between users of a specific messaging service/network, although some services offer inter-connectivity between services/networks.

SMS, also referred to as text messaging, is a service that enables users to exchange short text messages over a communication network. SMS is available on most mobile phones, some personal digital assistants and computers (typically via internet sites providing SMS services). The most common application of SMS is person-to-person messaging, but text messages can also be used to interact with automated systems, such as ordering products and services for mobile phones, participating in contests, receiving news alerts, receiving calendar alerts, voting in popular TV shows, and receiving weather or coastal warning alerts or other warnings.

SMS is a store and forward service, i.e., text messages are not sent directly from sender to recipient, but always via a Short Message Service Center (SMSC). The SMSC handles and manages the text messages by routing text messages between mobile users via each device's Mobile Station International Subscriber Directory Number (MSISDN).

With IM and SMS, and other messaging applications, becoming more and more common, users may receive many unwanted messages and be bombarded with large numbers of messages, both of which may be significant nuisances for the users. Realizing this problem, people have come up with ways to completely block some unwanted messages. But, it may not be possible or desirable to block certain users/messages since some of the messages sent by a user might be useful. But it being a free or easy to use option, people do misuse messaging services in a sense that they might send messages unnecessarily. There needs to be a way in which people can be restricted to send only useful and essential messages. There may be a need to restrict messages from certain users, so that they use the messaging services more efficiently, and only when needed.

BRIEF SUMMARY

Embodiments of the invention provide a method, system and computer program product for user initiated rule based restrictions on sending messages from a sender to a receiver. In one embodiment, the invention provides a method comprising the receiver establishing a set of rules for the sender and storing the set of rules in a datastore, said set of rules including allowing the sender a limited number of defined messages events with the receiver. The method further comprises the sender attempting to send a message to the receiver, and determining whether a message session currently exists between the sender and the receiver.

If a message session currently exists between the sender and the receiver, the set of rules established by the receiver are accessed to determine if the sender is allowed to send the message to the receiver during said message session currently existing. If the sender is allowed to send said message during the message session currently existing, the message is sent to the receiver.

In this embodiment, if a message session does not currently exist between the sender and the receiver, the set of rules established by the receiver are used to determine whether a new message session is allowed between the sender and the receiver. If a new message session is allowed, a new message session is established between the sender and the receiver, and the message is sent to the receiver during the new message session.

In one embodiment, the defined message events are message sessions, and the sender is allowed a limited number of message sessions with the receiver. In one embodiment, the defined message events are messages, and the sender is allowed to send a limited number of messages to the receiver.

In one embodiment, determining if the sender is allowed to send the message to the receiver during said message session currently existing includes determining if the message session currently existing has timed out. In an embodiment, determining if the sender is allowed to send the message to the receiver during the message session currently existing includes determining whether the receiver allows the message to be sent to the receiver in the message session currently existing even if the message session currently existing has timed out.

In an embodiment, the set of rules established by the receiver includes a limit on the number of message sessions allowed between the sender and the receiver during a defined time period. In one embodiment, determining whether a new message session is allowed includes determining whether this limit on the number of message sessions has been reached. In one embodiment, if this limit has been reached, an alert is sent to the sender to inform the sender that the limit has been reached, and the message is blocked from the receiver.

In one embodiment, the set of rules established by the sender includes an alert threshold number, and determining whether a new message session is allowed includes determining whether the number of message sessions between the sender and the receiver has reached this alert threshold number. In an embodiment, if this alert threshold has been reached, the sender is alerted that the threshold has been reached.

In one embodiment, a count is kept of the number of message sessions between the sender and the receiver during said defined time period. In an embodiment, selected ones of the message sessions between the sender and the receiver are not included in this count. The messages sessions not included in this count may be determined by criteria set by the receiver.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The present invention generally relates to messaging applications, such as text messaging and instant messaging; and more specifically, the invention relates to user initiated rule based restrictions on the use of messaging applications. As mentioned above, with IM, SMS and other messaging applications becoming very common, users may receive many unwanted messages and be bombarded with large numbers of messages, both of which may be significant problems for the users. Embodiments of the present invention effectively address these issues. Generally, this is done by enabling user initiated rule based restrictions on the use of messaging applications.

In one embodiment of the invention, the receiver establishes a set of rules for the sender that allows the sender a limited number of messages sessions with the receiver. When the sender attempts to send a message to the receiver, it is determined whether a message session currently exists between the sender and the receiver. If a current session exists, the rules set by the receiver are used to determine if the message is allowed to be sent to the receiver. If a session does not currently exist, the rules are used to determine whether a new session is allowed. If a new message session is allowed, a new session is established, and the message is sent to the receiver during the new session.

For example, to restrict or limit instant messaging, a user may be able:
1. To set user specific restriction rules for chat sessions and SMS;
2. To notify a sender of the number of chat sessions the sender can have in a particular, defined time frame;
3. To identify, detect and trace the number of chat sessions for a particular user, and to block that user from initiating a new chat session, if the set threshold is crossed;
4. To modify the set threshold at any time; and
5. To bypass the count of chat sessions so as to increase the threshold, if desired.

Also, to restrict or limit SMS, a user may be able:
1. To set user specific restriction rules for short messages;
2. To notify a sender of the number of SMS one can send in a particular time frame;
3. To identify, detect and trace the number of short messages for a particular user and to block that user from sending short messages, if the set threshold is crossed;
4. To modify the set threshold at any time;
5. To bypass the count of short messages so as to increase the threshold if desired by the receiver.

One embodiment of the invention provides the user (receiver) of an instant messaging or Short Messaging Service, with the ability to set predefined rules. The rules that the user can set may include the threshold chat session value for specific users (senders). This threshold value defines the number of chat sessions the sender can have with the receiver. This threshold will be for a predefined time frame. This time frame can also be configurable. In one embodiment, the sender will be informed about the allowed threshold value and will be alerted when the number of remaining allowed chat sessions goes below the minimal value set for alert.

When the sender initiates a chat session and sends the first message, it will be counted as one chat session. Also, in an active chat session, when the users do not communicate with each other for a specified time-out period, then that session will expire. Any new message sent after that will start up a new session and increment the count towards the permissible threshold value. The time-out period can also be configurable and user-specific.

The recipient user can also ignore from considering a particular chat session while taking into account the chat threshold. On the other hand, the receiver can manually end any chat session to increment the count.

Consider the following example:
Consider that there are 2 users: User A and User B. User B makes the following settings for User A.
   Chat session threshold: 10
   Time frame for threshold: 1 week
   Time-out of chat session: 30 mins.

This means that user A can start at maximum 10 chat sessions with User B in a time frame of 1 week.

Now, if User A is in an active chat session with User B and if there is no interaction between them for the last 30 minutes, the chat session will expire, which means that a new chat session will be started from the next chat message.

Once the restriction is in place, the sender will be informed about it so that the sender can use a messaging session judiciously. Also the sender can configure the system to receive alerts on every session start or when it crosses a minimum threshold. For instance, User A can set the Minimum Alert threshold as 3. So for the last 3 sessions, User A will be alerted with the information about the remaining permissible chat sessions.

User A starts a chat session with B on day 1. The permissible count is decremented by 1. After the completion of the chat session, the User A has another chat session with B after 2 hours lag. This further decrements the count as it is considered as a new chat session because of the time-out.

On day 2, the count is 8. User B starts a chat session with A. This does not affect the count since the that session is not initiated by A. Later, User A initiates a new chat session. The count goes to 7. In between the chat session, User B needs to take an hour break for lunch. When the chat resumes, User B decides to continue with the chat session by selecting to ignore the resumed chat session as a new chat session, and hence the count is not further decremented.

User A has had 7 chat sessions with User B in 5 days. On day 6, when User A again initiates a chat session, the system alerts User A that only 3 chat sessions are permitted for the next 2 days. User A can decide to continue with the chat session or to cancel it.

The count is again initialized to the predefined value, 10 at the end of 7 days.

This will keep the sender aware of the fact that there are a limited number of chat sessions permissible, and hence will only initiate a message session with the receiver, when it is absolutely necessary. The user can set different rules for different sets of users.

Figure 1:
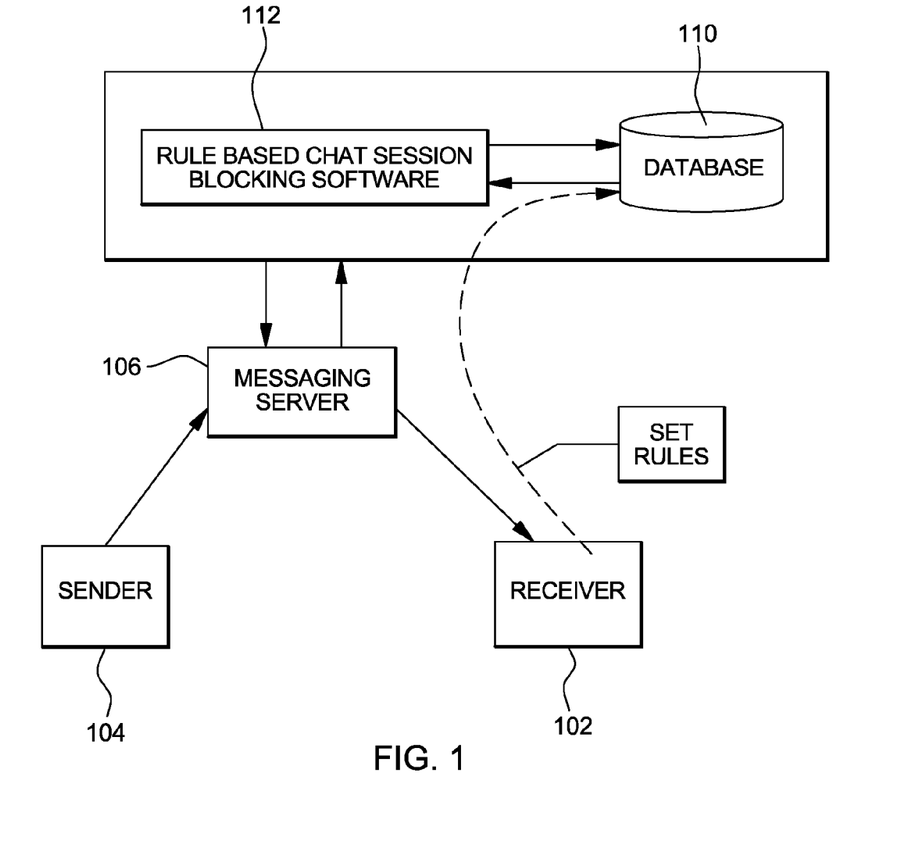
FIG. 1 shows an architecture illustrating principals of embodiments of the invention.

FIG. 1 depicts an architecture 100 illustrating principles of embodiments of the invention. This architecture includes a receiver unit 102, a sender unit 104, a message server 106, database 110 and software module 112. In one embodiment of the invention, message sessions are established between sender 104 and receiver 102, and messages are sent from the sender to the receiver via server 102. The receiver establishes a set of rules for the message sessions and the messages, and these rules are sent to and stored in database 110. When sender 104 attempts to send a message to receiver 102, the rules are accessed and used, via server 106 and software module 110, to determine if the message is allowed to be sent to the receiver.

Figure 2:
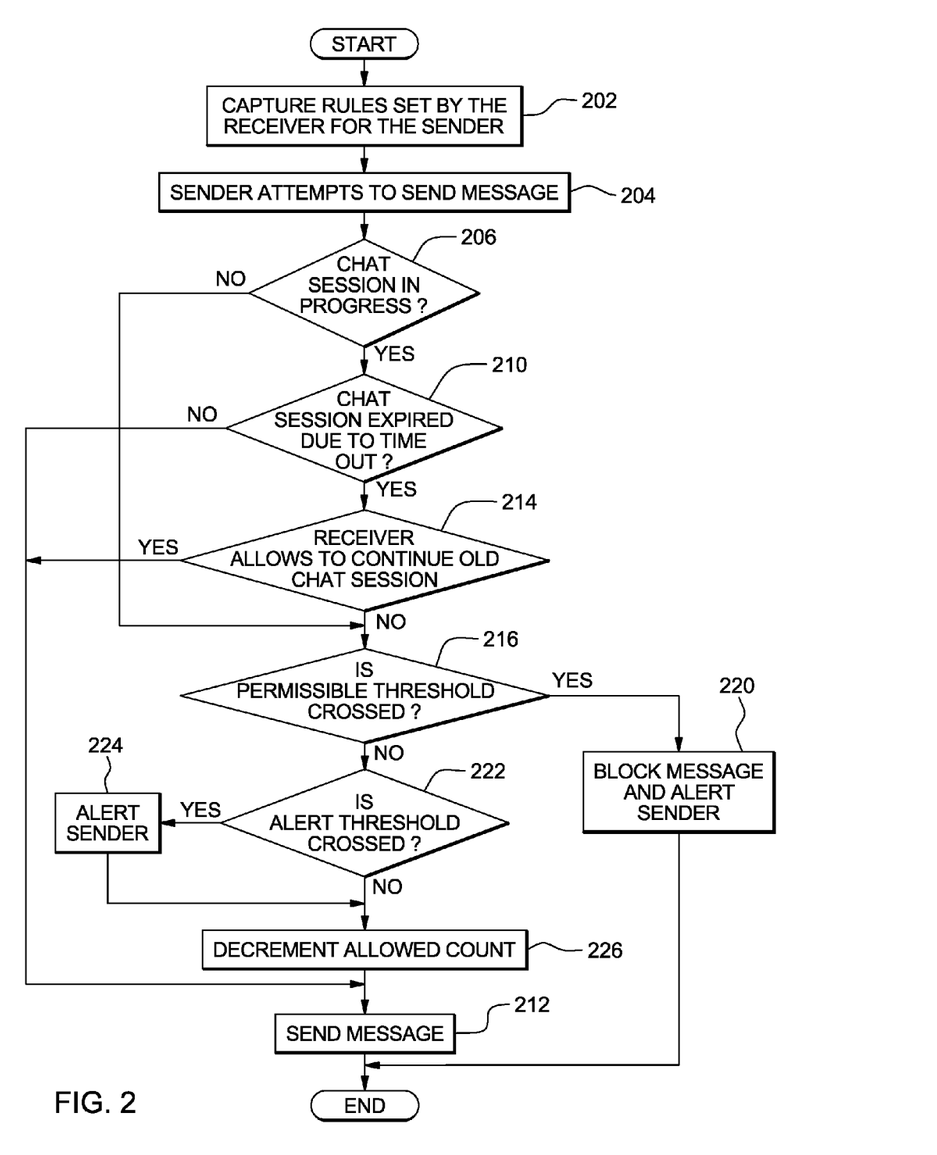
FIG. 2 is a flow chart showing the operation of an embodiment of the invention.

FIG. 2 illustrates one procedure for implementing an embodiment of the invention. With reference to FIGS. 1 and 2, at step 202, a set of rules set by receiver 102 for sender 104 are captured. At step 204, sender 104 attempts to send a message; and at step 206, the routine determines whether a message session is already in progress between the receiver and the sender. If a message session is already in progress, the routine proceeds to step 210, where a check is made to determine if the message session has expired due to a time out. If the message session has not expired due to a time out, the routine moves to step 212 and the message is sent from the sender to the recipient. If, however, at step 210, the message session has expired due to a time out, the procedure determines, at step 214, whether the receiver nonetheless allows the old message session to continue. If so, the message is sent, at step 212.

At step 214, if the receiver does not allow the message session to continue, the routine moves on to step 216. The routine also moves to step 216 directly from step 206 if at step 206, it is determined that a message session is not in progress. At step 216, the routine determines whether a permissible threshold has been crossed. If that threshold has been crossed, then at step 220, the message is blocked and an alert is sent to the sender. If, though, at step 216, no permissible threshold has been crossed, then the routine moves on to step 222, where it is determined if an alert threshold has been crossed. If so, an alert is sent to the sender at step 224 and the routine proceeds to step 226. If, at step 222, no alert threshold is crossed, the routine proceeds directly to step 226. At this step 226, the number of remaining allowable chat sessions is decremented by one; and then, at step 212, the message is sent from the sender to the recipient.

Figure 3:
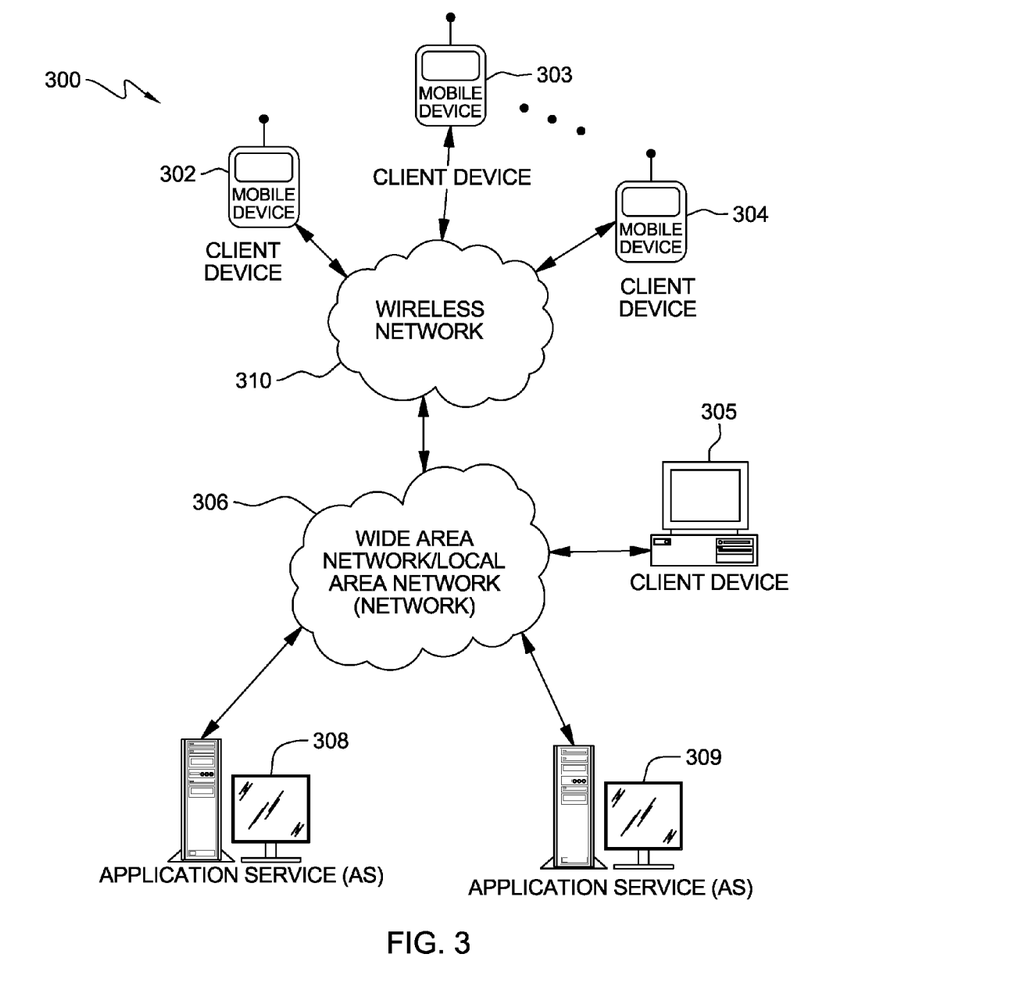
FIG. 3 shows a more detailed diagram of a communications network in which embodiments of the invention may be implemented.

FIG. 3 shows components of an exemplary environment in which the invention may be practiced. Not all the components may be required to practice the invention, and variations in the arrangement and type of the components may be made without departing from the spirit or scope of the invention. As shown, system 300 of FIG. 3 includes local area networks ("LANs")/wide area network 306, wireless network 110, mobile devices 102-104, client device 105, and application services (AS) 308-309.

Generally, mobile devices 302-304 may include virtually any portable computing device capable of receiving and sending a message over a network, such as networks 306, wireless network 310, and the like, to and from another computing device, another mobile device, and the like. Thus, mobile devices 302-304 may include virtually any portable computing device capable of connecting to another computing device and receiving information. Such devices include portable devices, such as cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 302-304 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 302-304 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 302-304 may uniquely identify themselves through any of a variety of mechanisms, including a phone number, Mobile Identification Number (MIN), an electronic serial number (ESN), Mobile Subscriber ISDN (MSISDN), network address, or other device identifier. The information may also indicate a content format that the mobile device is enabled to employ. Such information may be provided in a message, or the like, to other computing devices.

Mobile devices 302-304 may be configured to communicate a message, such as a text message, using Short Message Service (SMS), Multimedia Message Service (MMS), instant messaging (IM), internet relay chat (IRC), Mardam-Bey's IRC (mIRC), Jabber, and the like, between another computing device. However, the present invention is not limited to these message protocols, and virtually any other message protocol may be employed.

Mobile devices 302-304 may be further configured to enable a user to participate in communications sessions, such as text messaging sessions. As such, mobile devices 302-304 may include a client application that is configured to manage various actions on behalf of the client device. For example, the client application may enable a user to interact with the browser application, email application, IM applications, SMS application, and the like.

Mobile devices 302-304 may further be configured to include a client application that enables the end-user to log into an end-user account that may be managed by another computing device. Such end-user account, for example, may be configured to enable the end-user to receive emails, send/receive IM messages, SMS messages, access selected web pages, and the like. Moreover, the end-user account may be further configured to enable the end-user authorization to start an IM session, or other communications session, on a mobile device.

Mobile devices 302-304 may each receive messages sent from AS 108-109, from one of the other mobile devices 302-304, or even from another computing device. Mobile devices 302-304 may also send messages to one of AS 308-309, other mobile devices, or client device 305, or the like. In one embodiment, mobile devices 302-304 may request information to be sent to itself, using, for example, text messaging. In another embodiment, mobile devices 302-304 may also request that one of AS 308-309 send information using, for example, text messaging, to another mobile device 302-304 (or to client device 305). In one embodiment, the requesting mobile device may be charged a fee to receive the text message. In another embodiment, the requesting mobile device may instead receive payment for receipt of the text message, such as might arise based on a promotion, advertisement, or the like. In still another embodiment, where the text message is sent to a destination client device, such as one of mobile devices 302-304, or client device 305, the destination client device might be charged a fee for receiving and/or reading of the text message.

In one embodiment, the requesting mobile device (or client device 305), may be enabled to modify at least a portion of the text message to be sent by AS 308-309. For example, a user of the requesting device might be able to select, edit, or otherwise, provide at least a portion of the text message. In one embodiment, however, the user may have no control on the text message that is to be delivered to a destination client device.

Mobile devices 302-304 may also communicate with non-mobile client devices, such as client device 305, or the like. In one embodiment, such communications may include participation in social networking activities, receiving and/or sending text messages, or the like. The set of such devices may include devices that typically connect using a wired communications medium such as personal computers, multiprocessor systems, microprocessor-based or programmable consumer electronics, network PCs, or the like. Similarly, client device 305 may include one or more applications as described above in conjunction with mobile devices 302-304. For example, in one embodiment, client device 305 may be configured to request text messages from AS 308-309, and/or request text messages be sent by AS 308-309 to any of mobile devices 302-304, or even to itself.

Wireless network 310 is configured to couple mobile devices 302-304 and its components with network 306. Wireless network 310 may include any of a variety of wireless sub-networks that may further overlay stand-alone ad-hoc networks, and the like, to provide an infrastructure-oriented connection for mobile devices 302-304. Such sub-networks may include mesh networks, Wireless LAN (WLAN) networks, cellular networks, and the like.

Wireless network 310 may further include an autonomous system of terminals, gateways, routers, and the like connected by wireless radio links, and the like. These connectors may be configured to move freely and randomly and organize themselves arbitrarily, such that the topology of wireless network 310 may change rapidly.

Wireless network 310 may further employ a plurality of access technologies including, but not limited to 2nd (2G), 3rd (3G), 4th (4G) generation radio access for cellular systems, WLAN, Wireless Router (WR) mesh, and the like. Access technologies such as 2G, 3G, and future access networks may enable wide area coverage for mobile devices, such as mobile devices 302-304 with various degrees of mobility. For example, wireless network 310 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 310 may include virtually any wireless communication mechanism by which information may travel between mobile devices 302-304 and another computing device, network, and the like.

Networks 306 is enabled to employ any form of computer readable media for communicating information from one electronic device to another. Also, network 306 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 306 include any communication method by which information may travel between computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

AS 308-309 includes virtually any device that may be configured to provide an application service. Such application services or simply applications include, but are not limited to, email applications, search applications, video applications, audio applications, graphic applications, social networking applications, text message applications, or the like. In one embodiment, AS 308-309 may operate as a web server. However, AS 308-309 are not limited to web servers, and may also operate as a messaging server, a File Transfer Protocol (FTP) server, a database server, a content server, or the like, in which to provide an application. Additionally, each of AS 308-309 may be configured to perform a different operation. Thus, for example, AS 308 may be configured as a messaging server, while AS 309 is configured as a database server, social networking server, or the like. However, AS 308-309 may each be configured to communicate using text messages. Devices that may operate as AS 308-309 include personal computers desktop computers, multiprocessor systems, microprocessor-based or programmable consumer electronics, network PCs, servers, and the like.

AS 308-309 may be configured to initiate a message to be sent to one of client devices 302-305. Such messages may include, for example, an alert, an advertisement, a relayed message, a news message, or the like. In one embodiment, AS 308-309 may also respond to a request to perform some action, from one of client devices 302-305, or even another computing device. For example, in one embodiment, AS 308-309 may receive a request to send a message, an alert, an advertisement, or the like, to one or more of client devices 302-305. However, AS 308-309 are not limited to sending a message based on a request from another device. Thus, for example, AS 308-309 may also initiate sending of a text message to a computing device, based on an internal action, condition, or the like, including for example, promoting a new product, a new service, sending of an advertisement, or the like.

AS 308-309 may receive from a computing device a message asking that a message be sent to the requesting device's device identifier. AS 308-309, may also receive or otherwise determine, a user identifier, user account, or the like, associated with the requesting device. In one embodiment, AS 308-309 may also receive a destination device's device identifier. In one embodiment, AS 308-309 may be configured to charge a fee for sending the text message. In one embodiment, the fee might be charged to the requesting device, requesting user, or the like. In another embodiment, the fee might be charged to the destination device. However, a fee might also be charged to both the requesting device and to the destination device. In still another embodiment, the requesting and/or destination device may also receive a reward, such as payment, a discount, or the like, for messages received.

Figure 4:
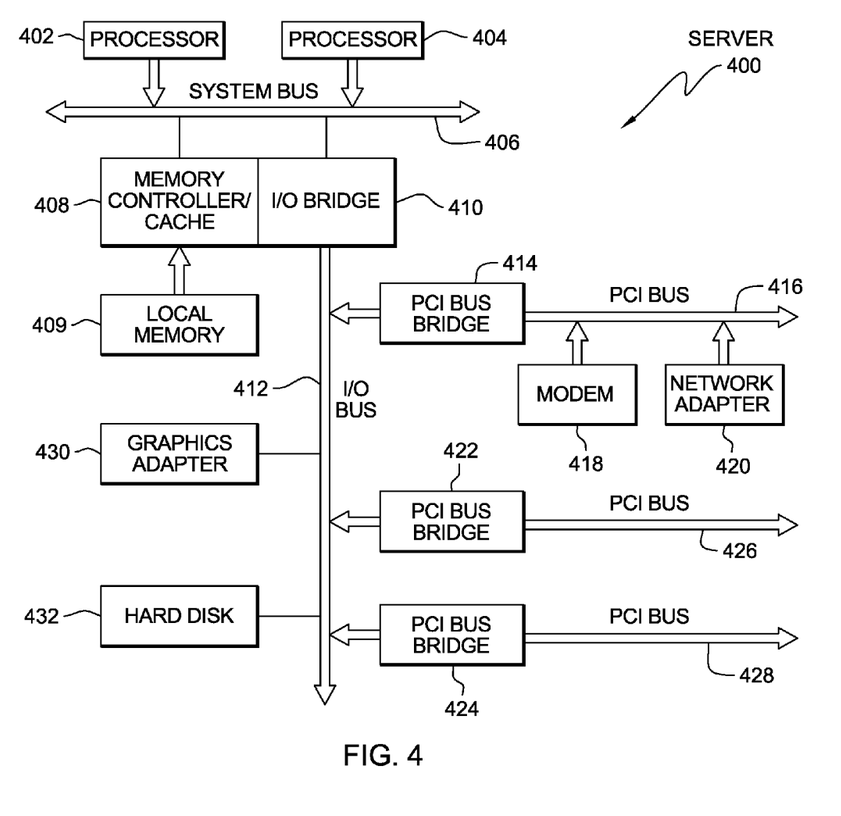
FIG. 4 is a block diagram illustrating an embodiment of the operation of one or more of the servers of the network of FIG. 3.

Referring to FIG. 4, a block diagram depicts a data processing system that may be implemented as a server, such as server 398 or 309 in FIG. 3, in accordance with an embodiment of the present invention. Data processing system 400 may be a symmetric multiprocessor (SMP) system including a plurality of processors 402 and 404 connected to system bus 406. Alternatively, a single processor system may be employed. Also connected to system bus 406 is memory controller/cache 408, which provides an interface to local memory 409. I/O bus bridge 410 is connected to system bus 406 and provides an interface to I/O bus 412. Memory controller/cache 408 and I/O bus bridge 410 may be integrated as depicted.

Peripheral component interconnect (PCI) bus bridge 414 connected to I/O bus 412 provides an interface to PCI local bus 416. A number of modems 418-420 may be connected to PCI bus 416. Typical PCI bus implementations support four PCI expansion slots or add-in connectors. Communications links to network computers, such as clients 302, 303, 304 and 305 in FIG. 3, may be provided through modem 418 and network adapter 420 connected to PCI local bus 416 through add-in boards. Additional PCI bus bridges 422 and 424 provide interfaces for additional PCI buses 426 and 428, from which additional modems or network adapters may be supported. In this manner, server 400 allows connections to multiple network computers. A memory-mapped graphics adapter 430 and hard disk 432 may also be connected to I/O bus 412 as depicted, either directly or indirectly.

Those of ordinary skill in the art will appreciate that the hardware depicted in FIG. 4 may vary. For example, other peripheral devices, such as optical disk drives and the like, also may be used in addition or in place of the hardware depicted. The depicted example is not meant to imply architectural limitations with respect to the present invention. The data processing system depicted in FIG. 4 may be, for example, an IBM RISC/System 6000, a product of International Business Machines Corporation in Armonk, N.Y., running the Advanced Interactive Executive (AIX) operating system.

Figure 5:
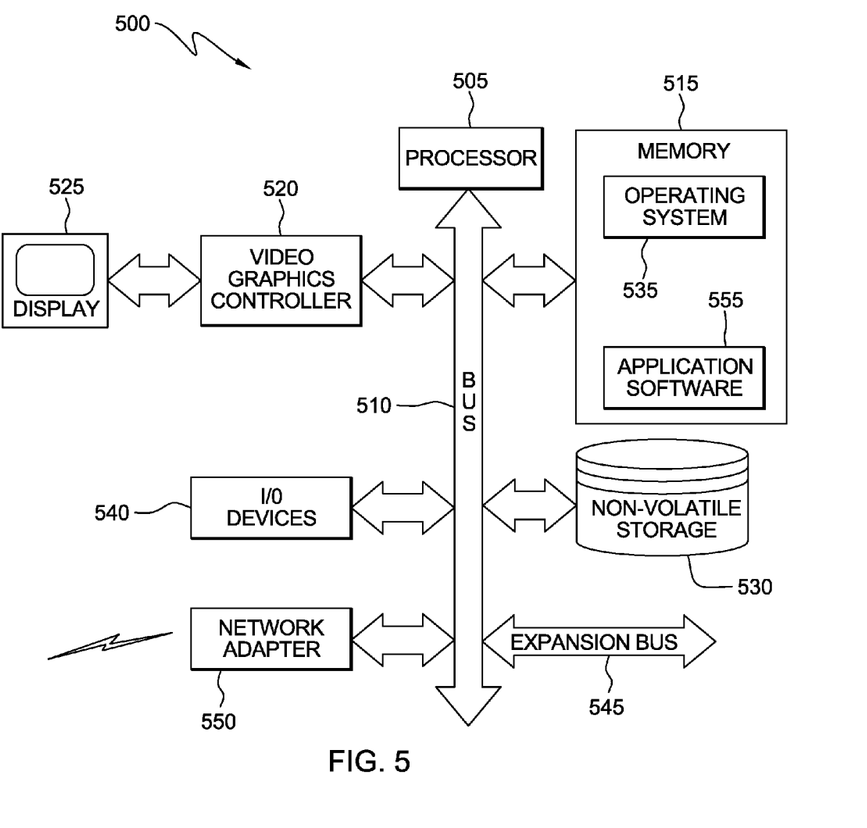
FIG. 5 is a block diagram showing an embodiment of the operation of one or more of the clients of the network of FIG. 3.

FIG. 5 shows a general purpose information system 500 that can be used in client devices 301, 302, 303. Information system 500 includes a processor 505. Bus 210 couples processor 505 to system memory 515 and video graphics controller 520. A display 525 couples to video graphics controller 520. Nonvolatile storage 530, such as a hard disk drive, CD drive, DVD drive, or other nonvolatile storage couples to bus 510 to provide system 200 with permanent storage of information. An operating system 535 loads in memory 515 to govern the operation of system 500. I/O devices 520, such as a keyboard, couple to bus 510. One or more expansion busses 545, such as USB, IEEE 1394 bus, ATA, SATA, PCI, PCIE and other busses, couple to bus 510 to facilitate the connection of peripherals and devices to system 500. A network adapter 550 couples to bus 510 to enable system 500 to connect by wire or wirelessly to network infrastructures such as network infrastructure shown in FIG. 3.

System 500 loads application software 555 from nonvolatile storage 530 to memory 515 for execution. The particular application software 555 loaded into memory 515 of system 500 determines the operational characteristics of system 500. System 500 is configurable as client devices 301, 302, 303. When system 500 acts as client devices 301, 302, 303 with instant messaging, system 500 loads an IM client application 525 into system memory 515.

While it is apparent that the invention herein disclosed is well calculated to fulfill the objectives discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of implementing user initiated rule based restrictions on the use of messaging applications, wherein message sessions are established between a pre-specified one sender and a receiver, and during each of the message sessions, one or more messages are sent from the pre-specified one sender to the receiver, the method comprising:
    the receiver establishing a set of specified rules for the pre-specified one sender, said set of rules including a limit on the number of message sessions the pre-specified one sender is allowed to establish with the receiver during a defined time period;
    the pre-specified one sender attempting to initiate a new message session with the receiver;
    determining, based on said set of rules and by using one or more processing units executing a messaging access program, whether a new message session is allowed to be established between the pre-identified one sender and the receiver, including determining whether a number of message sessions established between the pre-identified one sender and the receiver during said defined time period is less than the number of message sessions the pre-identified one sender is allowed to establish with the receiver during the defined time period;
    if the number of message sessions established between the pre-identified one sender and the receiver during said defined time period is less than the number of message sessions that the pre-specified one sender is allowed to establish with the receiver during said defined time period, establishing the new message session between the pre-specified one sender and the receiver; and
    the receiver modifying the set of specified rules based on specified actions of the sender.

2. The method according to claim 1, wherein the receiver modifying the set of specified rules includes the receiver modifying the number of message sessions the pre-identified one sender is allowed to initiate with the receiver during the defined time period.

3. The method according to claim 1, wherein the receiver modifying the set of specified rules includes the receiver modifying a number of messages the pre-identified one sender is allowed to send to the receiver during one of the message sessions.

4. The method according to claim 1, wherein the receiver modifying the set of specified rules includes the receiver modifying a length of the defined time period.

5. The method according to claim 4, wherein said determining if the new message session is allowed includes determining whether a message session currently exists between the pre-identified one sender and the receiver.

6. The method according to claim 1, further comprising notifying the sender of the number of message sessions the sender is allowed to establish with the receiver during the defined time period.

7. The method according to claim 1, further comprising when the number of message sessions that the pre-identified one sender is allowed to establish with the receiver has been reached, alerting the sender that said number has been reached.

8. The method according to claim 1, wherein the establishing a set of rules includes setting an alert threshold number of message sessions below the number of message sessions the specified one sender is allowed to establish with the receiver during the defined time period.

9. The method according to claim 8, further comprising when said alert threshold number of message sessions has been reached, alerting the specified one sender that said alert threshold number has been reached.

10. The method according to claim 1, wherein the determining, based on said set of rules and by using one or more processing units executing a messaging access program, whether a new message session is allowed:
keeping a count of the number of message sessions established between the specified one sender and the receiver during said defined time period; and
not including in said count selected ones of the message sessions established between the specified one sender and the receiver.

11. A system for implementing user initiated rule based restrictions on the use of messaging applications, wherein message sessions are established between a pre-specified one sender and a receiver, and during each of the message sessions, one or more messages are sent from the pre-specified one sender to the receiver, the system comprising:
a receiver communications device for establishing and modifying a set of specified rules for the pre-specified one sender, said set of rules including a limit on the number of message sessions the pre-specified one sender is allowed to establish with the receiver communications device during a defined time period;
a memory storage device for storing the set of rules;
a pre-specified one sender communications device for attempting to initiate a new message session with the receiver communications device; and
one or more processor units including instructions for:
receiving from the receiver communications device the set of specified rules;
receiving input from the receiver communications device for modifying the set of specified rules based on specified actions of the sender communications device;
determining, based on said set of rules, whether a new message session is allowed to be established between the pre-identified one sender communications device and the receiver communications device, including determining whether a number of message sessions established between the pre-identified one sender communications device and the receiver communications device during said defined time period is less than the number of message sessions the pre-identified one sender communications device is allowed to establish with the receiver communications device during the defined time period; and
if the number of message sessions established between the pre-identified one sender communications device and the receiver communications device during said defined time period is less than the number of message sessions that the pre-specified one sender communications device is allowed to establish with the receiver communications device during said defined time period, establishing the new message session between the pre-specified one sender communications device and the receiver communications device.

12. The system according to claim 11, wherein the receiver unit communications device modifies the number of message sessions the pre-specified one sender communications device is allowed to initiate with the receiver communications device during the defined time period.

13. The system according to claim 11, wherein the receiver communications device modifies a number of messages the pre-specified one sender communications device is allowed to send to the receiver communications device during one of the message sessions.

14. The system according to claim 11, wherein the receiver communications device modifies a length of the defined time period.

15. The system according to claim 11, wherein said determining if the new message session is allowed includes determining whether a message session currently exists between the identified one sender communications device and the receiver communications device.

16. An article of manufacture comprising:
at least one tangible computer readable device having computer readable program code logic tangibly embodied therein to execute machine instructions in one or more processing units for implementing user initiated rule-based restrictions on a messaging application in a communication network, wherein message sessions are established between a pre-specified one sender and a receiver and during each of the message sessions, one or more messages are sent from the pre-specified one sender to the receiver, said computer readable program code logic, when executing, performing the following:
receiving a set of specified rules for the pre-specified one sender, said set of rules including a limit on the number of message sessions the pre-specified one sender is allowed to establish with the receiver during a defined time period;
when the pre-specified one sender attempts to initiate a new message session with the receiver, determining, based on said set of rules, whether a new message session is allowed to be established between the pre-identified one sender and the receiver, including determining whether a number of message sessions established between the pre-identified one sender and the receiver during said defined time period is less than the number of message sessions the pre-identified one sender is allowed to establish with the receiver during the defined time period;
if the number of message sessions established between the pre-identified one sender and the receiver during said defined time period is less than the number of message sessions that the pre-specified one sender is allowed to establish with the receiver during said defined time period, establishing the new message session between the pre-specified one sender and the receiver; and receiving input from the receiver for modifying the set of specified rules based on specified actions of the sender.

17. The article of manufacture according to claim 16, wherein the receiving input from the receiver includes receiving input for modifying the number of message sessions the pre-identified one sender is allowed to initiate with the receiver during the defined time period.

18. The article of manufacture according to claim 16, wherein the receiving input from the receiver includes receiving input for modifying a number of messages the pre-identified one sender is allowed to send to the receiver during one of the message sessions.

19. The article of manufacture according to claim 16, wherein the receiving input from the receiver includes receiving input for modifying a length of the defined time period.

20. The article of manufacture according to claim 16, wherein said determining if the new message session is allowed includes determining whether a message session currently exists between the pre-identified one sender and the receiver.

* * * * *